(12) United States Patent
Edwards et al.

(10) Patent No.: US 11,294,074 B2
(45) Date of Patent: Apr. 5, 2022

(54) TRACKING SYSTEM AND METHOD

(71) Applicant: SCI-TECH (POB) LTD, Oxford (GB)

(72) Inventors: Christine Edwards, Oxford (GB); Peter Hall, Oxford (GB)

(73) Assignee: SCI-TECH (POB) LTD, Oxford (GB)

( * ) Notice: Subject to any disclaimer, the term of this patent is extended or adjusted under 35 U.S.C. 154(b) by 252 days.

(21) Appl. No.: 16/080,439

(22) PCT Filed: Feb. 28, 2017

(86) PCT No.: PCT/EP2017/054593
§ 371 (c)(1),
(2) Date: Aug. 28, 2018

(87) PCT Pub. No.: WO2017/148912
PCT Pub. Date: Sep. 8, 2017

(65) Prior Publication Data
US 2021/0190970 A1    Jun. 24, 2021

(30) Foreign Application Priority Data

Feb. 29, 2016  (GB) ..................................... 1603466

(51) Int. Cl.
*G01S 19/51* (2010.01)
*H04B 17/318* (2015.01)
(Continued)

(52) U.S. Cl.
CPC .............. *G01S 19/51* (2013.01); *G01S 19/19* (2013.01); *H04B 17/318* (2015.01);
(Continued)

(58) Field of Classification Search
CPC ............ G01S 19/51; G01S 19/19; G01S 5/28; H04W 4/80; H04W 4/029; H04W 4/90;
(Continued)

(56) References Cited

U.S. PATENT DOCUMENTS 6,222,484 B1   4/2001  Seiple et al.
6,246,376 B1   6/2001  Bork et al.
(Continued)

FOREIGN PATENT DOCUMENTS

GB    2409778 A     7/2005
WO    02077943 A1   10/2002
(Continued)

OTHER PUBLICATIONS

International Search Report and Written Opinion for PCT/EP2017/054593 dated May 30, 2017, 13 pages.
(Continued)

*Primary Examiner* — An T Nguyen
(74) *Attorney, Agent, or Firm* — Fay Sharpe LLP

(57) ABSTRACT

The invention relates to a tracking system and method comprising: a first and second tracking units comprising a satellite signal receiver, a microprocessor, a radio frequency (RF) transmitter and receiver; and an indicator means; and in which upon activation of the first unit, the first unit satellite signal receiver is arranged to receive satellite signals and to determine a location of the first unit. The first unit microprocessor is arranged in operation to receive the location from the first unit satellite signal receiver and generate a first unit location signal in dependence upon said location; and the first unit RF transmitter is arranged to transmit said signal; the second unit is arranged to receive satellite signals and calculate a second unit location; the second unit microprocessor is arranged in operation to receive the second unit location from the second unit satellite receiver. The second unit RF receiver is arranged to receive said first unit location signal; and the second unit microprocessor is arranged upon receipt of said first unit location signal to determine the first unit location; and determine a bearing and distance in dependence upon the first unit location and the second unit
(Continued)

location; and indicate said bearing and distance on said second unit indicator means. The first tracking unit also includes a line of sight obstruction detecting means for detecting the presence of nearby obstructions, a height position determining means for determining the relative height of the first tracking unit, wherein the microprocessor includes means of calculating, with reference to a time source, an optimum communications window to transmit and receive an RF signal in the future, based on the detected nearby obstructions, if any, the height position data, and calculated predicted values for the wave height and period, and sends an instruction to the RF transmitter to transmit a signal in the optimum communications window.

18 Claims, 7 Drawing Sheets

(51) Int. Cl.
*H04W 4/029* (2018.01)
*H04W 4/90* (2018.01)
*H04W 4/80* (2018.01)
*G01S 19/19* (2010.01)

(52) U.S. Cl.
CPC ............ *H04W 4/029* (2018.02); *H04W 4/80* (2018.02); *H04W 4/90* (2018.02)

(58) Field of Classification Search
CPC .......... H04B 17/318; B63C 2009/0017; B63C 11/26
See application file for complete search history.

(56) References Cited

U.S. PATENT DOCUMENTS

| | | | |
|---|---|---|---|
| 6,414,629 B1* | 7/2002 | Curcio | B63C 9/0005 342/357.52 |
| 2003/0107516 A1 | 6/2003 | Hansmann et al. | |
| 2011/0140886 A1 | 6/2011 | Bettonvil et al. | |
| 2014/0097982 A1 | 4/2014 | Cornett et al. | |
| 2014/0114608 A1* | 4/2014 | Achanta | G01S 19/23 702/176 |
| 2015/0284062 A1* | 10/2015 | Brodin | G01S 19/19 701/468 |
| 2016/0020804 A1* | 1/2016 | Lee | H04W 8/205 455/558 |
| 2018/0070559 A1* | 3/2018 | So | G01S 19/13 |

FOREIGN PATENT DOCUMENTS

| | | |
|---|---|---|
| WO | 03042032 A1 | 5/2003 |
| WO | 2005064559 A1 | 7/2005 |

OTHER PUBLICATIONS

International Search Report for PCT/GB2004/005450 dated May 18, 2005, 3 pages.
International Preliminary Report on Patentability for PCT/GB2004/005450 dated Jul. 3, 2006, 6 pages.
UK Search Report of Application Serial No. GB 1603466.2 dated Nov. 10, 2016, 1 page.

* cited by examiner

Figure 2 Tracker Unit Block Diagram

TRACKING SYSTEM AND METHOD

CROSS-REFERENCE TO RELATED APPLICATIONS

This application is a National Stage Entry of PCT/EP2017/054593, and claims priority to, and the benefit of, Great Britain Patent Application No. GB 1603466.2, filed Feb. 29, 2016, the entirety of which is hereby incorporated by reference as if fully set forth herein.

The present invention relates to a tracking system, in particular for tracking persons, in particular divers, but also vehicles or other items.

BACKGROUND OF THE INVENTION

Tracking systems are known based on cellular mobile networks but these have limitations on the accuracy of the location of the tracked device and are also not useful in remote areas or environments where there is no cellular mobile network.

Various different emergency positioning beacons exist and whilst they are all helpful in generally enabling a distress signal to be transmitted, each have a number of performance shortfalls from the perspective of both the crew and any search and rescue organisation seeking to respond to the emergency incident. They can only be used in an emergency, not for continuously tracking people who are not in an emergency but are in a potentially dangerous situation.

In recent years, concentrated focus on safety issues by the appropriate regulating bodies in the maritime world has resulted in the conception of, and introduction of, a worldwide automated safety system: the Global Maritime Distress and Safety System (GMDSS). This system supersedes manual systems operated by coastguards and rescue services.

Recreational vessels do not need to comply with GMDSS radio carriage requirements. The equipment most likely to be carried by divers and leisure watersports participants are listed below, together with their operation and their restrictions.

An Emergency Position Indicating Radio Beacon (EPIRB) is a radio beacon used to alert Search and Rescue (SAR) services in the event of an emergency. It does this by transmitting a coded message on the 406 MHz distress frequency via satellite and earth stations to the nearest rescue co-ordination centre, which could be situated in a different country or world region from where the emergency is happening. Some EPIRBs also have a built-in GNSS receiver that provides a location which is incorporated into the EPIRB's message, so enabling SAR services to go to that location.

EPIRBs can also simultaneously transmit a signal on the 121.5 MHz non-emergency frequency, providing a direction for SAR services to follow.

For vessels, there are large EPIRBs that transmit on 406.025 MHz, usually known as 406 MHz EPIRBs. These are more sophisticated devices that are mandatory for merchant vessels operating in GMDSS designated areas A2 to A4 (A2 is 20/30 miles to 150 miles off shore, A3 is beyond 150 miles, A4 is Polar regions). These devices have the ship identity encoded into them and alert shore based services via COSPAS SARSAT satellites. Some yachts carry the 406 MHz EPIRB.

For individuals, there are smaller 'personal' EPIRBs, known as Personal Locator Beacons (PLBs). Designed to be worn by the boat crew, they can be automatic or manual. They transmit on the same frequencies as described above for other EPIRBs, and operate in the same way, though have a much shorter operational life due to the smaller battery. Device operation is not satisfactory for divers and other maritime users, as the signals are sent via satellite to a shore based station located elsewhere which verifies the emergency and then activates a rescue. There can be a considerable delay between activation and rescue, which in some circumstances can be life threatening.

Direction finders for an EPIRB working on the inshore 121.5 MHz frequency that is based on the boat are known, but the direction finding equipment cost is high, and it only gives an approximate bearing to the person being rescued.

Personal proximity detectors are small electronic devices worn by the crew that are constantly monitored by a fixed unit on board the boat. When a crew member moves outside of a pre-determined range, an on-board alarm is sounded. Some systems interface with the ship's GNSS receiver and log the boat's position at that moment; this is taken to be the position that the crew member fell overboard. The system does not monitor the position of the casualty in the water as he or she drifts with the current, and even if the boat manages to return to the logged position, the casualty will not be there and may be hard to see and retrieve. Additionally, these kinds of systems are limited in range, and are prone to generating false alarms.

Most boats carry on board aids for navigation, including GNSS receivers (for location using satellite positioning technology), Chartplotters (to display chart information with vessel position) and Fish Finders (to locate underwater objects using SONAR). Some GNSS Receivers, Chart Plotters and Fish Finders have a button that will log a position when pressed. This can be used to mark when a person or object has fallen overboard. The device can then guide the vessel back to that position. These devices do not take account of tidal drift, wind effect or any other influence on the person or object's changing position.

U.S. Pat. No. 6,222,484 describes a personal emergency location system using a personal global position system (GPS) in which a personal unit transmits a personal position to a base unit on a vessel. A disadvantage of this system is that a personal antenna and satellite transmitter must be deployed in order to successfully transmit the personal location to the base unit.

Accordingly, it is desired to provide an improved tracking system and method.

SUMMARY OF THE INVENTION

According to the invention there is provided a tracking system comprising: a first tracking unit and a second tracking unit each unit comprising a satellite signal receiver, a microprocessor, a radio frequency (RF) transmitter and receiver; and an indicator means; and in which upon activation of the first unit, the first unit satellite signal receiver is arranged to receive satellite signals and to determine a location of the first unit; the first unit microprocessor is arranged in operation to receive the location from the first unit satellite signal receiver and generate a first unit location signal in dependence upon said location; and the first unit RF transmitter is arranged to transmit said signal; the second unit is arranged to receive satellite signals and calculate a second unit location; the second unit microprocessor is arranged in operation to receive the second unit location from the second unit satellite receiver; the second unit RF receiver is arranged to receive said first unit location signal; and the second unit microprocessor is arranged upon receipt of said first unit location signal to determine the first unit location; and determine a bearing and distance in dependence upon the first unit location and the second unit location; and indicate said bearing and distance on said second unit indicator means, characterised in that the first tracking unit also includes a line of sight obstruction detecting means for detecting the presence of nearby obstructions, a height position determining means for determining the relative height of the first tracking unit, wherein the microprocessor includes means of calculating, with reference to a time source, an optimum communications window to transmit and receive an RF signal in the future, based on the detected nearby obstructions, if any, the height position data, and calculated predicted values for the wave height and period, and sends an instruction to the RF transmitter to transmit a signal in the optimum communications window.

Other aspects of the invention are defined in the appended claims.

DETAILED DESCRIPTION OF THE INVENTION

The invention provides a tracking system. In one embodiment the tracking system may be used to keep track of one or more divers during a diving expedition with one or more divers. This is an exemplary embodiment and the skilled person will appreciate that the tracking system will be useful for many other emergency and non-emergency applications such as man over-board, end of dive pick up, tracking personnel and assets on large area installations such as wind farms, solar farms, oil rigs large chemical and other factories, large construction projects etc. The invention could also be useful for other watersports such as sailing, canoeing, kayaking.

The embodiment provides an aid to the boat crew to recover divers quickly at the end of a dive, minimising the time spent by the waiting divers in the water, and reducing the risk of divers becoming separated from their boat An embodiment will now be described, by way of example only, with reference to the accompanying drawings, in which, FIG. 1 illustrates a diving operation using a tracking system in accordance with the present invention;

Figure 1:
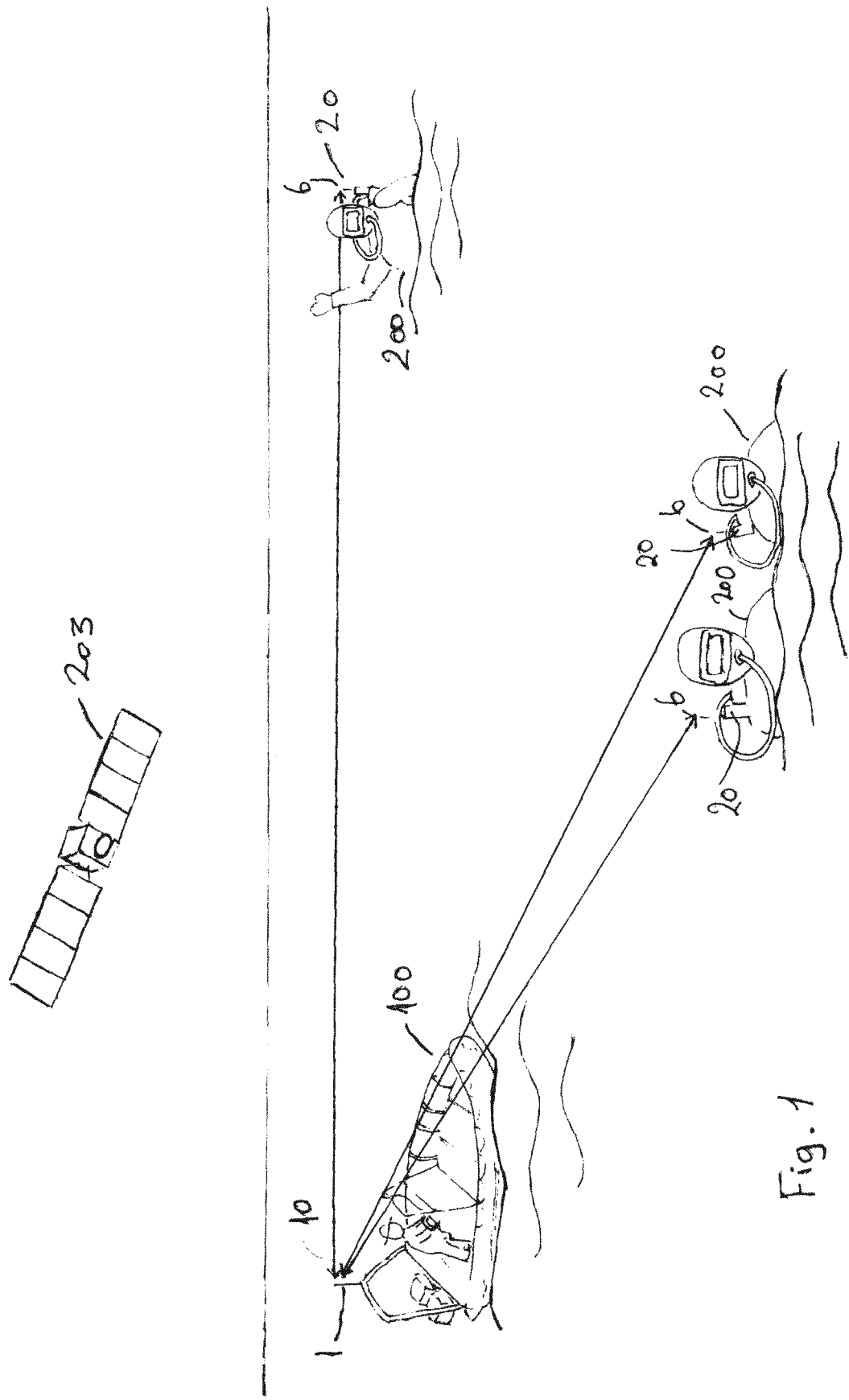

FIG. 1 illustrates a typical end-of-dive scenario for leisure divers. A number of divers 200 have just surfaced after ending their dives. They typically surface at different times and in different locations.

A dive cover boat 100 with crew on board attempts to monitor and follow the surfacing divers and pick them up.

Weather conditions and the sea state can make this process difficult and protracted. The divers 200 are tired and need to be picked up quickly, and returned to shore or a cabin on the boat, where they can receive hot drinks and food, and rest. The next set of divers will then be taken for their dive.

There may be divers that need picking up before others, due to extreme tiredness, injury, or other urgent need.

Sometimes divers 200 surface a long way from the cover boat, they cannot see the boat and the crew cannot see them, and despite searching by the crew, divers can become separated from the boat. In this situation, Search and Rescue Services are called out. The divers can spend hours in the water, often suffering from exposure-related conditions requiring hospitalisation.

Divers need to be sure that the boat can locate them and retrieve them quickly; boat crew need to be sure that they can also do this. Current methods used by divers to signal the boat are limited in operation, and can be affected by weather conditions and sea state; some do not alert the dive cover boat itself.

In the embodiment described, each of the boat or base unit 10 and personal unit 20 has a common functionality, including that each one can receive a location from another unit and knowing its own location, can determine the distance and bearing of the other unit, and show it on its indicator. Therefore each unit having the functionality of either a base station or a node or both combined.

The sequence of steps of operation of the tracking units in an embodiment of the invention will now be described.
Dive Preparation Each diver has a tracking unit 20, and a tracking unit 10 is also installed on the dive cover boat. In this embodiment the diver tracking unit 20 and the boat tracking unit 10 are interchangeble and have the same functionality, although in other embodiments they may be tailored for each location. Before each dive all the tracking units 10, 20 are powered on, as part of the preparation for a dive. They perform an automatic self-check to ensure they are operating correctly, as indicated by LEDs or on the units' displays, or on Bluetooth-enabled auxiliary devices that may be paired with the tracking units.

Each unit automatically establishes its location using its own GNSS receiver 1, and performs a process that establishes communications with the other tracking units 10, 20 via the RF radio.

If desired, the divers and crew pair the tracking units with Bluetooth-enabled devices e.g. the boat unit with an iPad or android tablet 15, and diver unit with a SmartPhone. Alternatively, the crew can physically connect the boat unit to the boat's navigation system e.g. Chartplotter 14.

The crew and/or divers perform a Registration process that links tracking units to individual divers and their cover boat. This is a one-time procedure that only needs to be repeated if the units and/or individual divers and/or cover boat have changed since previous use of the system.
Starting the Dive The crew and divers make their way to the dive site in the dive cover boat 100.

The dive site can be located any distance off the coast in-shore or off-shore. Mobile phone network coverage may not exist or be patchy, and definitely will not exist at off-shore locations. This precludes divers using mobile phone based trackers.

Dive sites can be located inland for example at lakes or converted quarries. The boat 100 may not be required, and what would have been the boat unit 10 could be deployed on the shore or in the Site Club House, and monitored by fellow divers or Site Staff.

Dive sites can be located close in-shore e.g. estuaries or coves, in which case divers enter the water from the Shore, and what would have been the boat unit can be deployed on the Shore and monitored by fellow divers or other personnel such as Coastguard, RNLI, etc.

The divers 200 leave the boat 100 and enter the water.

The dive starts when the divers submerge their tracking units 20. The units 20 automatically detect this by one or more of the following:

Increased pressure via pressure sensor 3,
Feedback from light sensor 7,
Feedback from Accelerometer 8,
Loss of GNSS signal,
Loss of Communications.

The diver units 20 now conserve battery power by:

Automatically ceasing transmissions,
Automatically powering down to a 'sleep state'.

The boat unit 10 stores each last diver unit location recorded, and optionally displays them to the Crew.

During the Dive

Each diver's tracking unit 20 periodically and briefly powers up to check that it is still submerged. If so, it re-enters 'sleep state' to conserve battery power. When the unit 20 briefly powers up, it also logs depth with input from the depth sensor, which in this embodiment is the pressure sensor 3. The software program that controls the unit 20 operation contains an algorithm that controls frequency of unit 20 power up based on inputs including depth, so that it can trigger full unit power on as the diver 200 approaches the surface of the water. So when the diver 200 is actually on the surface, the unit 20 is ready to communicate and ready to get a GNSS fix.

Ending the Dive

The divers come back up to the surface, typically in an ad-hoc manner. Their tracking units automatically detect that they are no longer submerged by one or more of the following:

Normal pressure in the pressure sensor 3,
Light sensor 7 feedback,
Feedback from Accelerometer 8,
Detecting RF communications activity,
Detecting GNSS signals.

(Although unit detection of the submerged or the surfaced states is described as being done automatically, it could also be done by supplying a means to the diver of indicating these states manually, for example via another button press or via the diver's paired Bluetooth-enabled auxilliary Device).

On surfacing, each diver tracking unit establishes its location again, which happens quickly as the satellite data held by the unit will still be current. Each unit recommences transmissions.

A typical end-of-dive scenario is illustrated in FIG. 1, and shows the Diver Tracker System in operation.

The satellite 203, represents constellation(s) of Positioning Satellites, including position augmentation systems that increase the accuracy of positioning calculations in GNSS receivers 1. These include: EGNOS (European Geostationary Navigation Overlay Service), WAAS (Wide Area Augmentation System) which performs the same function as EGNOS for North America and Hawaii, GAGAN (GPS Aided Geo Augmented Navigation) for India, and MSAS (Multi-functional Satellite Augmentation System) for Japan.

Each diver 200 has a tracking unit 20, and the dive cover boat 100 has a tracking unit 10. The units calculate their own (accurate) locations using satellite positioning data.

The boat unit 10 is shown as fixed to the A-Frame on the rear of the boat 100, but could be located anywhere on a dive boat 100 at a suitable height that will ensure the best conditions for communications. The divers 200 are shown with units 20 fixed to their breathing gear, but units 20 can be fixed anywhere on their kit, or held up, or fixed to the end of an extending rod 11.

The boat unit 10 communicates with an external system such as: the boat navigation display, or auxilliary Device (e.g. tablet or smart phone), using a different shorter-range frequency such as Bluetooth, to present location data for the boat 100 and divers 200 to the boat crew; or it can use its own display to indicate this.

GNSS stands for Global Navigation Satellite System. It is a generic term, covering any satellite system that can be used to generate a location on the Earth's surface. Examples include: GPS, GLONASS. The generic term GNSS is used in preference to the term GPS, which is a specific satellite constellation. A GNSS signal is received by the diver unit 20 and by the boat unit 10 from a number of satellites 203 (of which only one is shown) and these signals are used to determine their respective locations. Any suitable satellite standard may be used such as GPS, GLONASS, EGNOS/WAAS and Galileo; and the tracking unit will preferably be configured to receive signals from any one and/or more than one satellite operating any one and/or more than one of these standards.

The units 20 communicate with each other, using longer-range non-emergency radio frequency (RF), which means that they can be in continuous contact (limited only by any Regulatory transmission requirements imposed (by e.g. Ofcom) as a result of using a particular frequency). Each unit includes a radio antenna 9 and a radio transceiver 16.

The tracking units communicate and exchange data with one another, periodically, but also ad-hoc as needed.

One aspect of this feature is that the units 10, 20 periodically transmit their location. This enables any unit to calculate range and bearing to any other unit. The location, range and bearing of the diver units with respect to the boat unit is presented to the dive boat crew, and they use it to monitor divers, navigate to them and retrieve them quickly, all in real time. The range and bearing of the dive cover boat with respect to each diver unit is indicated to individual divers, by the flashing LEDs, or the built-in display, or on their paired Bluetooth-enabled Smart Phone or other device, etc., so that individual divers can know their cover boat activity in real time.

Figure 2:
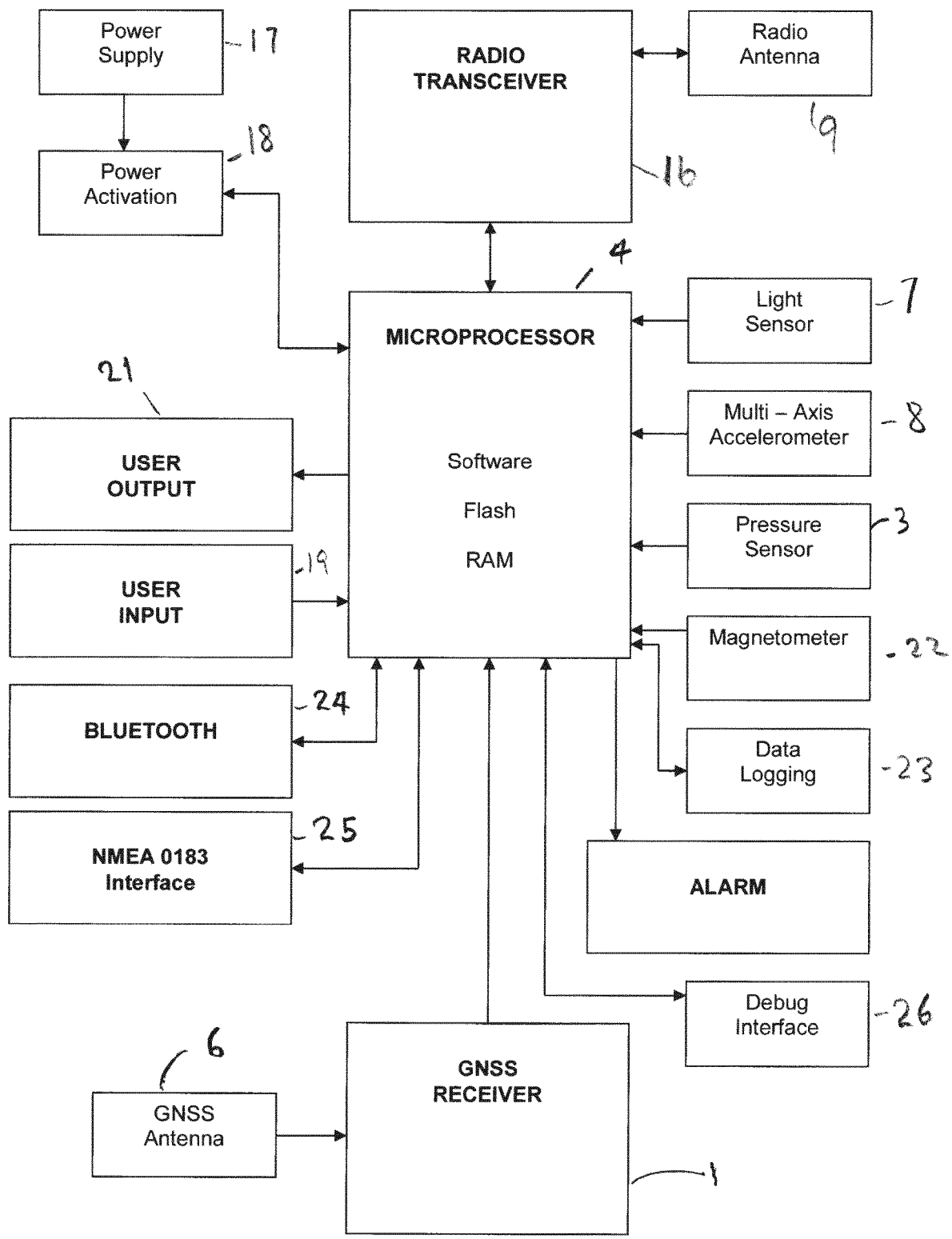
FIG. 2 illustrates a tracking unit in accordance with the present invention in block diagram form.

Referring to FIG. 2, the tracking unit 20 incorporates a power supply 17 that provides power to all components of the tracking unit 20. The user can activate or de-activate the power supply 17 using a Power Activation function 18. An example of Power Activation is a power on/off button that the user may push. The de-activation of power is controlled by the microprocessor following, for example, the user pushing the power on/off button for a pre-determined length of time.

The tracking unit incorporates a microprocessor 4, which is a programmable device that contains a software program that controls the operation of the tracking unit 10, 20. Alternatively, a Programmable Logic Device (PLD, for example a Field Programmable Gate Array (FPGA)) containing programmable Logic may be used to control the operation of the tracking unit, or a combination of microprocessor and PLD. The software program controls the tracking unit operation in accordance with data passed to it from the GNSS receiver 1, the radio transceiver 16, the User Input device(s) 19, the sensors 7, 8, 3, 22, the Bluetooth device 24, the NMEA 0183 Interface 25, and the Debug Interface 26.

The GNSS Antenna 6 receives signals from the GNSS satellites (203 in FIG. 1) and passes them to the GNSS receiver 1, which uses them to determine the location of the tracking units 10, 20. This location is passed to the microprocessor 4.

The radio antenna 9 receives radio signals and passes them to the radio transceiver 16, which reconstructs data from the signals and passes the data to the microprocessor 4.

The microprocessor 4 may send data to the Radio Transceiver 16, which converts them into signals that are transmitted using the Radio Antenna 9.

The Radio Antenna 9 is mounted as high as possible in order to have, as far as is possible, an unobstructed 360 degree coverage.

The tracking unit 10, 20 incorporates a User Input device or devices 19. The user interacts with it or them, which interaction is converted into varying electronic signals that are passed to the microprocessor. One example is a button or buttons that the user may push, another example is a touch-sensitive screen that the user may touch.

The tracking unit 10, 20 incorporates a User Output device or devices 21. The microprocessor sends data to the User Output device(s) 21, which presents the data to the user in a human-understandable form. One example is text and symbols on a display, another example is LEDs flashing in a coded sequence.

The tracking unit 10, 20 incorporates other sensors including: Light Sensor 7, Multi-Axis Accelerometer 8, Pressure Sensor 3, and Magnetometer 22. These generate varying electronic signals to indicate sensed data, which are passed to the microprocessor. The sensed data includes: varying light levels, varying pressure levels, varying acceleration and orientation over multiple degrees of freedom, varying magnetic field strength and direction.

The tracking unit 10, 20 also incorporates a short distance low energy radio frequency device such as a Bluetooth device 24. The microprocessor exchanges data with the Bluetooth device, and it exchanges data via its inbuilt antenna with any Bluetooth-enabled devices within range. The tracking unit Bluetooth device may have been paired with another Bluetooth-enabled device when preparing for the dive. Examples of other Bluetooth-enabled devices are: Smart Phones, Apple iPads (FIG. 3(b)), Tablets, Android mobile devices, Laptops, Computers, other tracking units, etc. The microprocessor 4 may therefore receive data originating from another paired device, and send data to it, via the Bluetooth device.

The tracking unit 10, 20 incorporates an interface 25 configured to the NMEA 0183 standard. By this means, the user may connect the tracking unit 10, 20 to an external device that has an interface also configured to the NMEA 0183 standard.

The microprocessor 4 may send data to the NMEA 0183 Interface, and by this means, indicate the divers' locations, ranges, bearings, Alert statuses and any other relevant information to the boat crew on a compatible device connected to it. An example of such an external compatible device is a Chartplotter 14 (FIG. 3(a)), or a computer 15 configured as a Chartplotter.

The microprocessor 4 may also receive data from the NMEA 0183 Interface, and by this means, accept data from a compatible device connected to it. An example of such an external compatible device is another GNSS receiver (for fail-safe location backup), or a SONAR device (for indicating underwater locations and objects).

The tracking unit 10, 20 incorporates a Data Logging device 23. The microprocessor 4 may store data in the Data Logging device 23 and may retrieve stored data from it. By this means, the user may store data and retrieve it later.

The microprocessor 4 may communicate data by passing it to the radio transceiver 16, and by this means, share its data with other tracking units. Also by this means, it can receive commands that influence the tracking unit operation and it can send commands that influence the operation of other tracking units within range. These communications are encoded in accordance with a Communications Protocol (described later). These communications are transmitted in accordance with the optimum communications window (described later).

The microprocessor 4 may communicate data to the user by passing it to the User Output device(s) 21.

The user may influence the operation of the tracking unit 10, 20 by interacting with the software program in the microprocessor 4. The user may interact with the microprocessor by any of the following means:
- by means of the User Input device(s) 19 and the User Output device(s) 21.
- via the tracking unit's Bluetooth device 24, by exchanging data with it using a paired Bluetooth-enabled auxiliary device.

The tracking unit may incorporate a Debug Interface 26, which can be connected to a compatible interface on a computer. By this means, a trained technical person may monitor the software program running in real-time in the microprocessor. The microprocessor 4 may send data to the Debug Interface. The trained technical person may interact with the software program by sending data to it via the Debug Interface that influences the execution of the software program.

The trained technical person may load new versions of the software program into the microprocessor. This may be done locally via the Debug Interface, or remotely via the radio transceiver.

Figure 3:
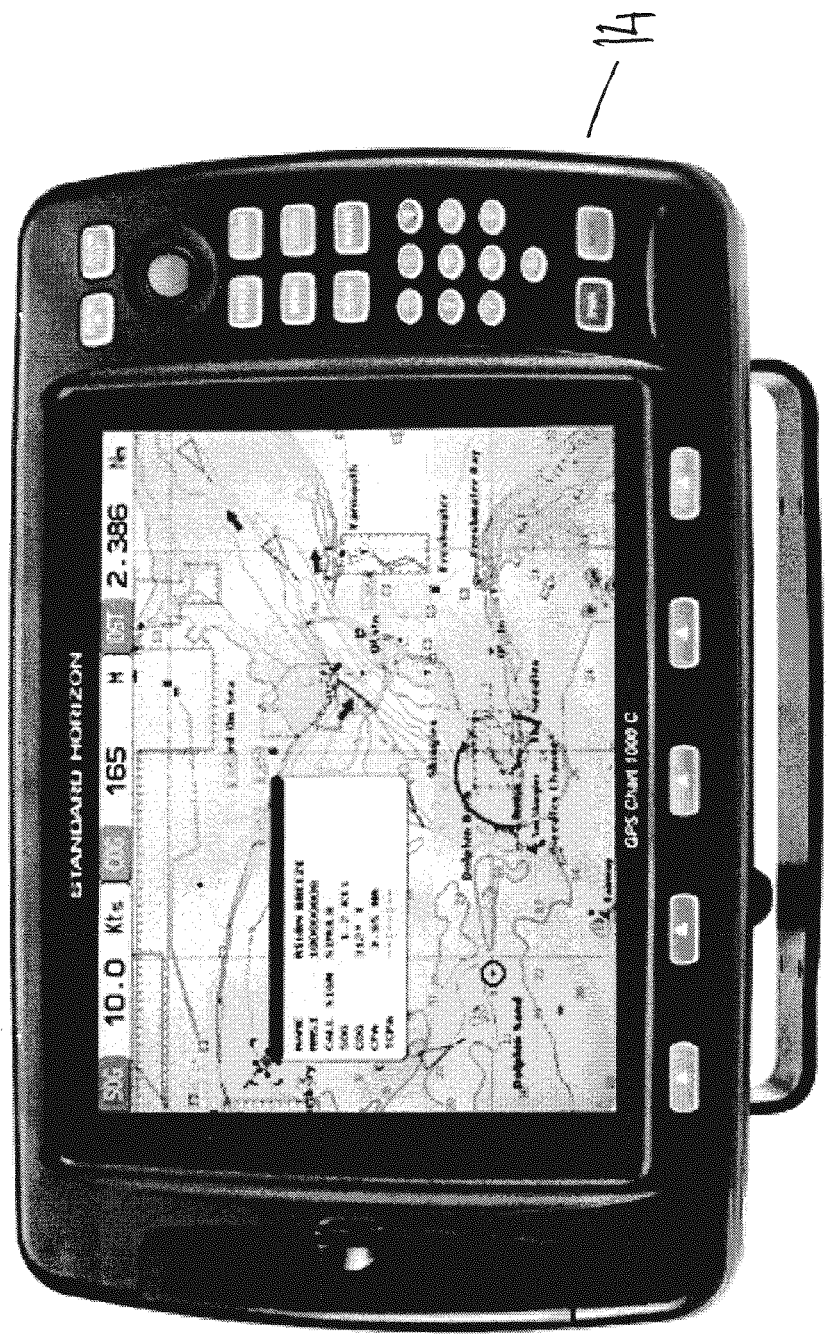
FIG. 3(a) illustrates a chart plotter, for use with the invention.
FIG. 3(b) illustrates a smart device for use with the invention.
Figure 3B:

The boat unit 10 receives signals from other diver units 20. The microprocessor decodes it and if it is location data, calculates distance and bearing to each of the diver units in dependence upon the divers' locations and the boat location determined by use of the boat unit's GNSS signal. The boat unit 10 sends the divers' locations, and the calculated distance and bearing to them periodically to the boat unit's Output Device, or to the NMEA 0183 Interface connected to the boat's navigation equipment (e.g. Chartplotter), or to the Bluetooth device for transmission to any Bluetooth-enabled auxilliary device that may be paired with the boat unit. FIG. 3(a) shows an example of a preferred item of boat navigation equipment, a chart plotter 14 that can be physically connected to the tracker unit. FIG. 3(b) shows an example of a preferred Bluetooth-enabled auxilliary device 15 (an iPad) that can be paired with the tracker unit 20 via the Bluetooth device 24.

The crew are therefore assisted in the diver recovery by being shown the direction in which to steer, and how far away the diver is. If, when the microprocessor decodes signals received from other diver units 20, it is Alert data, then the boat unit 10 raises an alarm, such as a visual (flashing light) and otherwise indicates an Alert situation on the boat unit's User Output device(s), or indicates an Alert situation on the boat's navigation equipment that is connected to the boat tracking unit 10, or sends Alert data to it's Bluetooth device for transmission to any Bluetooth-enabled auxilliary device that may be paired with the boat unit. These actions alert the boat crew that one or more divers require urgent assistance.

Diver units 20 will also receive signals and decode them. If they are location data, then a similar calculation of range and bearing may be performed and presented together with location data to the diver via the User Output device, or via the Bluetooth link to a paired Bluetooth-enabled auxiliary device.

Divers are therefore assisted, by being shown an indication of the direction of the dive cover boat and how far away it is. This is advantageous as a diver may start swimming towards the cover boat, if possible, or towards nearer divers to form a group that can be retrieved together.

If the Diver units 20 receive data that is Alert data then an Alert situation will be indicated to divers via the User Output device, or via the Bluetooth link to a paired Bluetooth-enabled auxiliary device. This is advantageous for divers, as they will know that their retrieval has been delayed, and divers near the distressed diver may swim towards him or her to render assistance and comfort, if possible.

The FIG. 1 shows a surfacing diver who needs assistance, as indicated by the raised arm. The diver has used User Input to activate an Alert situation (for example, by pressing the Alert button on his/her unit, but could be by another method for example by software algorithm) to broadcast Alert data. It is received by the boat unit and presented to the Crew, who then go and pick up that diver first. Other units will receive this Alert data, and individual divers can know if there is an Alert situation that prevents their immediate retrieval.

Completing the Dive Expedition

As each diver is retrieved, his/her tracking unit goes through a process in which it communicates that fact to the boat unit, is removed from the crew's indicator, and is powered down. The process is activated under diver control using User Input, for example, by holding down the diver's unit power button for an extended period, or by using an algorithm to automatically decide completion, or by an additional button, or by control from a paired Bluetooth-enabled auxiliary device, or by control from the boat unit via the RF radio link, etc.

Once all units have been removed in this way, the dive is complete.

Communications

The communications link between divers and cover boat is vital, and its design and operation must be robust to withstand the adverse conditions at sea.

To achieve locating and retrieving divers quickly, it is vital that unit transmissions reach their destination. This is achieved by:

Implementing a dedicated Communications Protocol
Calculating an Optimum Communications Window in which to make transmissions
Intelligent Routing Communications Protocol The communications protocol is layered, hierarchically. Together with all the units being operated, it creates an ad-hoc network.

The bottom layer is designed to ensure that data packets do reach their intended destination, and that they are error-free. It incorporates a system whereby a receiving unit signals the transmitting unit with information about the communication that it has received from the transmitting unit, together with a system for how the transmitting unit responds to that information. This system significantly reduces the likelihood of lost communications and corrupt communications.

The next layer up allows data relevant to the diver network to be broadcast and exchanged between units. It is designed to allow flexibility, so that data packet content can be changed or extended, and different kinds of packets can be added as the need arises to extend the functionality of the system as a whole. An example of data relevant to the diver network is the data packet that contains the unit Location.

The next layer up allows the diver network to communicate with external networks. These can be, for example, other diver networks at sea within radio range, or a shore-based network monitored by the dive club, or a shore-based or air-borne network on a compatible frequency run by emergency services such as the RNLI. An example of this is Hand-Over described below.

The protocol can be extended to add more layers as need arises to extend the functionality of the system as a whole.

Optimum Communications Window

Figure 4:
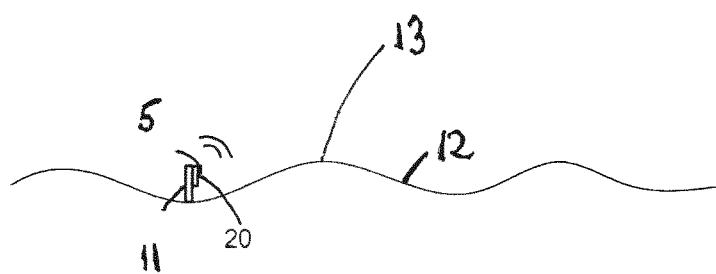
FIG. 4 illustrates a tracking unit in open sea in surrounding waves.

When the divers are on the surface the radio signal may be shielded by waves if conditions are rough, as shown in FIG. 4. There may be obstacles between the diver and the boat that temporarily prevent radio communications, such as a large rock.

In the prior art, use of an accelerometer is known to determine when a radio-enabled device is on or near to a wave crest, so that a radio signal from that device would have the best chance of getting to its destination. U.S. Pat. No. 6,414,629B1, a Man Overboard device, uses input from an accelerometer, detecting when the device is on or near the wave crest, and calculates an optimal time interval for radio transmissions.

The present invention relates to a different and improved apparatus and method. Each unit individually uses a variety of inputs to detect obstacles to local line of sight radio communications, and calculates the Optimum Communications Window. This is a time interval during which radio transmissions from the unit have the best chance of reaching their destination(s), and also during which the unit has the best chance of receiving radio signals. The Window can be of any duration, can be constant or vary, and can recur at a regular or irregular rate.

Obstacles to local line of sight radio communications when at sea can include: natural topographical features such as rocks; maritime 'furniture' such as buoys; vessels; and bodies of water (waves).

A unit takes inputs from: a variety of physical sensors; its internal clock; and data from its on-board communications system including communications protocol statistics and settings for the communications device (RF radio). Its physical sensors include: an accelerometer, on-board GNSS receiver, light sensor, magnetometer and depth sensor. The on-board communications system is the communications device together with a custom communications protocol. The on-board communications system and the magnetometer provide information about whether obstacles are present in the line of sight between the unit's radio and its intended destination. It also provides signals duration data. The physical sensors variously provide information about: the unit's motion in multiple dimensions and relative orientation/position to obstacles; wave amplitude; time; and (possible) immersion data.

The time source is provided primarily by a first one of a two time sources, preferably from the satellite signals, and in the event of the failure of the satellite signals time source the microprocessor detects the failure and utilises a second time source such as the internal clock.

Similarly, the line of sight obstruction detecting means is provided primarily by a first one of two line of sight detecting means such as the RF, and in the event of the failure of the primary means the microprocessor detects the failure and utilises the second means, such as a light source.

Likewise, the height position determining means is provided primarily by a first one of two or more height position determining means, such as by an accelerometer, and in the event of the failure of the primary determining means the microprocessor detects the failure and utilises a second height position determining means, such as from the pressure sensor or satellite signal.

The unit passes all this information to its Optimum Communications Window algorithm which combines them to calculate the Optimum Communications Window. The unit's system software controls when and how often the algorithm is used, as the Window is recalculated regularly or ad-hoc as needed. The Window duration and when it recurs depends on the nature of the obstacles. For example, on the open sea in a flat calm the window would be indefinitely long; on the open sea in choppy conditions, the window would be short and would recur at a time matching the period of the waves; at sea near rocks, the window would be short and intermittent.

This determines a window of opportunity during which the diver unit may communicate with other units. Another benefit is that power may be conserved by not attempting to transmit outside of this window of opportunity.

Intelligent Routing

Usually, the diver unit will attempt to communicate directly with the boat unit. There will be times, however, when this will not be possible perhaps due to obstacles or being just out of radio range with the boat. The unit may still be in range of other diver units and able to communicate with them. In this case, the diver unit will attempt to communicate indirectly with the boat unit. The communications protocol will re-route that unit's transmissions around the network until it reaches its destination.

Data Exchange Between Units

Each unit can dead-reckon, each unit can power-save intelligently, each unit can adjust its radio's duty cycle intelligently, and each unit can broadcast an Alert. This also means that the system is not limited to exchanging solely location data, but can also exchange other data, including, for example time, battery level, identity, meaningful codes, text, etc. Each unit can therefore know the status of any other unit.

Dead Reckoning

The distance and bearing are calculated using the location transmitted by each unit. If the signal is lost, either due to being blocked by an obstacle such as a wave, or by being out of range, or if the signal is continuously corrupt for a defined period of time; then the boat unit reverts to calculating distance and bearing using 'dead-reckoning'. 'Dead-reckoning' means taking a logged pattern of positions, determining the pattern of movement, and predicting this into the future. In addition the boat unit may receive data from meteorological reports and local current, tides and prevailing wind data to determine a likely bearing and distance. Some transceivers have the ability to monitor received signal strength, so the signal reaching the limits of its range can be detected. The communications protocol can therefore determine if no signals, or only corrupted signals, are detected over a defined period, and so can determine for the boat unit when the diver is deemed to be out of range.

This estimated 'dead-reckoned' position (together with the consequent range and bearing) is presented to the boat crew as 'estimated' as opposed to 'actual' data. The diver unit itself can also detect loss of RF communications (via the communications protocol), and enter power saving mode until communications are restored. In this case, the unit still transmits, though less frequently, and between transmissions it puts operational chips into sleep mode. In this mode, the unit may still receive signals, and if this occurs, the communications protocol will detect it and trigger the unit to exit power saving mode.

Hand-Over

A drifting diver may go completely out of range of his/her own network. His/her unit detects this via the communications protocol, and enters power-saving mode as previously described to conserve battery life.

However, there may be other compatible networks in the vicinity, and the diver may drift into range of one of these. Alternatively, a compatible system operated by SAR services may come into contact with the diver unit.

If the communications protocol detects signals, and after exiting power-saving mode, it detects a different new network, it will perform a 'hand-over' in which it leaves the original network and joins the new network (a network can be just two units), and attempts to inform the old network of this fact, either directly or indirectly through the new network.

The new network may already have been tracking the diver, but when notified that the diver is joining the new network, the network operators will know that they must retrieve the diver themselves.

Data Logging

Every unit can store data in its on-board Data Logging Chip. This can be location data, or any other data that its on-board sensors create, including data generated by the communications protocol. This can be used after Dive Completion to analyse the dive, and share dive data through for example social media. In extreme cases of diver death, it can be used to help understand what happened to the diver.

The boat unit can interface via the NMEA0183 interface to other kinds of NMEA0183-enabled displays which can be used to display the location information, including Chartplotters, and Fish Finders.

The method for encoding the transmitted signal, and the protocol used for signal transmission will now be described.

Radio waves do not propagate very far through water. In heavy seas, the diver will be rising and falling within the waves and sometimes the body of the wave will be between the diver and the boat, or there may be other obstructions such as rocks, blocking communications with the boat.

The diver is potentially out of sight of the receiving unit for a considerable period of time, especially if the antenna on the boat is mounted in a low position. Assuming that the period between waves is 5 seconds, and that line of sight between the two antennae occurs for 1 second, then there is an 80% chance that the antennae do not 'see' each other.

Another consideration is the amount of time taken to physically transmit the diver position. The longer it takes to transmit this data, the greater the chance that some of the transmission will be lost as the diver sinks into a trough.

The aim is to keep the transmission as short as possible, by ensuring that location data is represented in an efficient form (for example by using binary number representation), and by minimising the number of bytes of data to be transmitted (for example by using a compression algorithm).

Also, the aim is to transmit the data as quickly as possible, so that all the data manages to leave the unit's radio transceiver, before the Optimum Communications Window is over, and obstructions such as waves may block transmissions again.

It is not possible to continuously re-transmit diver positions and assume that some will be received by the boat because there are rules for the frequencies which are used, most of which impose a maximum limit on the radio duty cycle, that is, impose a limit on the percentage of overall time that is the unit is transmitting. Furthermore constant retransmission would also be very inefficient for power consumption.

In this embodiment the essential details of the message are encoded into an encoded signal. This compresses the transmission time of the message to a few milliseconds.

A telecommunications protocol enables the following things:
  to help ensure that the data arrives at its destination (the transmitter knows that the receiver has got it). This handshake is the bottom layer.
  to create the potential for intelligent action within the network. There is an intermediate layer where differently identified messages exist, and the receiving unit can take different action depending on the type of message.
  Examples include:
  Message containing location data, the receiver determines distance and bearing.
  Message containing Alert, so that the unit on the boat can alert the crew monitoring it.
  Message containing request to reduce transmitting power from another unit if they are too close together.
  Message containing low battery alert so that a neighbouring unit re-routes the transmitting unit's location data to the boat so that it can reduce its output power and save its battery.
  Message containing an icon code for display on the indicator/LED flash pattern.
  Message containing a command to reconfigure the receiving unit as a base (boat) unit or a mobile (diver) unit or a combination of the two.
  Message containing Entering Sleep mode/Awake mode for the transmitting unit.
  There is also a layer above this, where one network can communicate with another, examples:
  Message to hand a unit over to a neighbouring network
  Message to alert another (e.g. shore-based) network to an escalating situation
  Message to alert another (e.g. shore-based) network that a dangerous situation was safely resolved.

The communications system operating in a diver unit will try to establish a direct two-way link with the boat unit's communications system. However, this may not be possible, due to obstructions, or range issues, in which case, the diver unit communications system will try to establish an indirect link with the boat unit using other diver units nearby to relay its signals. If this is not possible, perhaps due to range issues, then a diver unit's communications system will try to establish a direct two-way link with another nearby diver unit, as though the other diver unit was a boat unit. In this way, a diver will be tracked by a member of the network, and reduce his/her risk of being lost. If this is not possible, perhaps due to range issues, then the diver unit communications system triggers entry into power saving mode, as previously described, transmitting the location signal less frequently and monitoring received signals.

For each unit the receiver can signal to the transmitter that it (the transmitter) can adjust its transmission power based on primarily the received RF signal strength but also on the range between the two units. For example, a unit receiving a weak signal can signal to the transmitter to increase transmission power (regardless of range). Or, if a unit receives a strong signal and calculates that the transmitter is nearby, the receiver can signal to the transmitter to reduce power (to conserve its battery) when transmitting to this particular receiver. This is handled by the Communications System. The unit in the boat may be an exception to this general rule, in that it will also have the capacity to decide to always transmit at full power, ignoring the above rule. This is because it may be connected to boat's power, and it is not necessary for it to conserve its battery. Transmitting at full power will allow the unit in the boat to communicate at its fullest range, and so provide the best chance for communication with all units. However all units have this power saving capability because all units may be used as either base units or diver units, or both functions simultaneously.

Referring to FIG. 4, it is possible to determine the period of the waves 12, and thus the position of the diver 20 in relation to the crest 13 of a wave. This is an optimum position for line-of-sight transmission to the boat. This information can be determined by analysing the pattern of communications protocol success and failures with the boat tracking unit. Although a wave crest is an optimum position for line-of-sight transmissions, less optimal positions relative to the wave crest may also have a good chance of reaching their destination. This creates the concept of a window of opportunity during which transmissions have a good chance of reaching their destination, as opposed to only transmitting when on the wave crest. This increases the chances of a signal getting through, as there is a longer period for communication with the destination unit.

Figure 5:
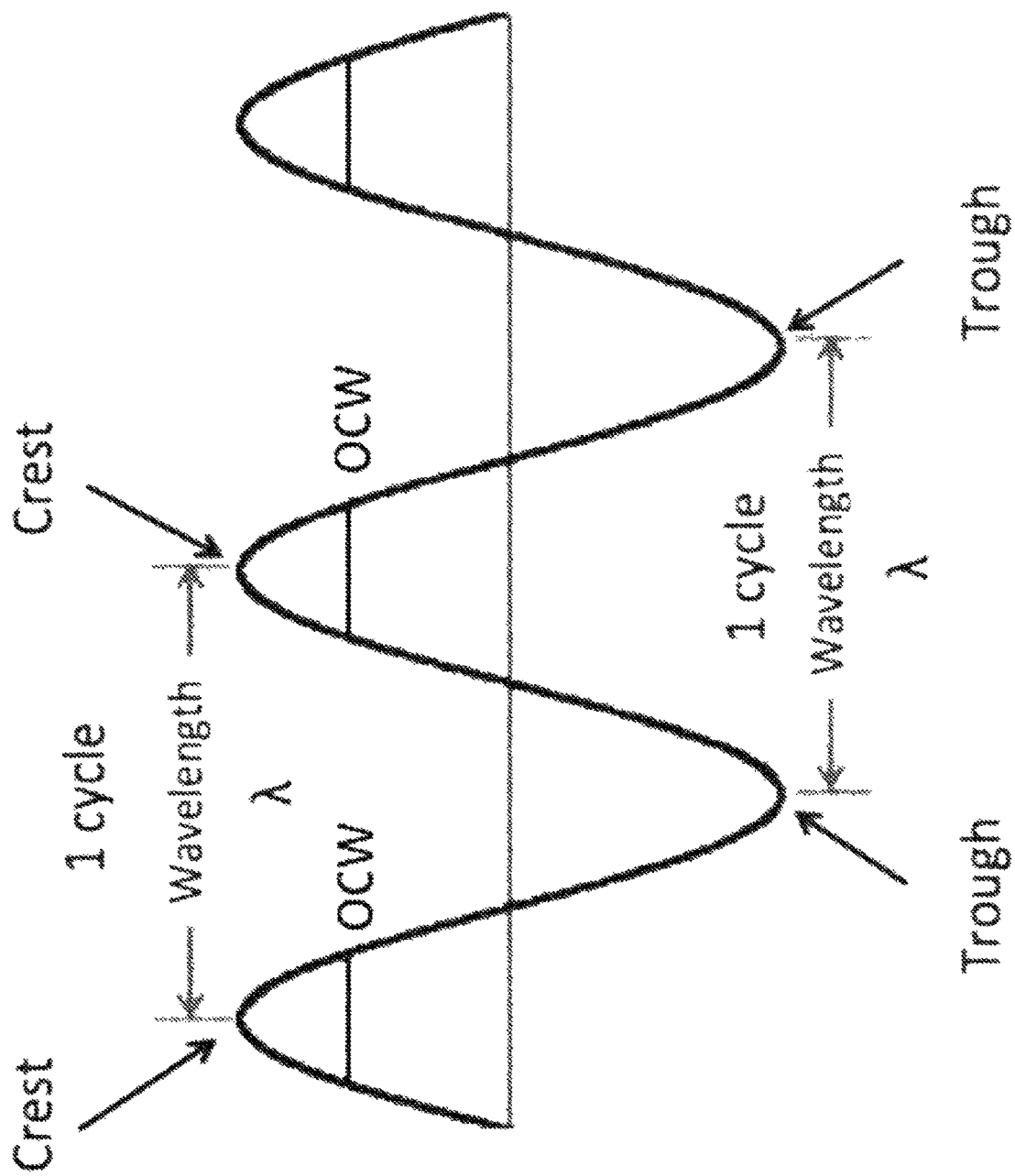
FIG. 5 illustrates a wave model showing an optimum communications window (OCW)

To clarify, if the sea wave pattern is similar to a sine wave, as shown in FIG. 5, and the message takes 200 msec to send, the ideal time to start transmitting is 100 msec before the top of the wave. If the wave falls off quicker after the peak, it would be better to start the transmission earlier. A number of sensors and other inputs can be used to provide an accurate model of the surrounding wave properties. The personal unit is preferably provided with an accelerometer to provide acceleration data which is used to calculate the wave characteristics of motion over multiple axes.

This can be combined with the pattern of communications failures as described above to further improve the accuracy of the wave model.

In addition to location, battery level, codes etc., mentioned before, the units also transmit/receive unique unit identity. The units displayed on the (visual) Indicator can thus be identified. The network 'knows' exactly who is part of it, and who is missing.

Units can be transferred between different networks. For example, in one scenario where a drifting diver is going out of range of Network 1 and becoming in range of Network 2, so the diver may be in range of both Networks, though the two networks may be out of radio range with each other. In which case, the drifting diver unit will signal to Network 1 that it is leaving (when at the limit of range with Network 1, and also via Network 2 if that is possible), and then to Network 2 that it is joining. (This would be handled by the higher layer of the communications protocol).

The personal unit must be small enough to be worn in a number of ways (pendant, wristwatch) without impeding movement. If the unit is fitted into a wristwatch case it could also function as a very accurate watch.

Advantageously each tracking unit, especially those with a lower battery charge capacity will also have a power saving algorithm.

The power saving algorithm takes a number of inputs including:
Operational duration, Proximity of other units, Battery level.

Its outputs include: power Level setting for radio, Radio Duty Cycle (time period between transmissions), GNSS Receiver Sleep State Setting (time period between activations to get satellite signals and compute location).

Based on these variables the charge time left can be calculated. In addition a power saving mode can be triggered in response to the remaining calculated charge time. It can also be triggered in response to being submerged.

The tracking unit may be built into a self-inflating lifebelt or buoyancy aid. The tracking unit may be combined with a strobe light which can be incorporated in a self-inflating lifejacket, or attached to the crew, or worn by the crew in some other way.

The tracking unit must be small enough to be unobtrusive yet still be able to transmit enough signal power to be received at a reasonable distance.

The tracking unit could have rechargeable batteries or replaceable batteries. A wind up charger, or a charger that is powered by an energy harvester, could be provided to extend the range. In addition, an indication of the battery charge level is provided.

The tracking unit could be attached to a smart phone in a suitable water protective casing and either configured to communicate with the smart phone via Bluetooth or be directly connected to the personal tracking unit. The personal unit could be configured to utilise parts of the smart phone such as the accelerometer or light sensor or alternatively be integrated with the smart phone so the user has just one device.

The tracking unit will provide an indication to the diver that the signal has been sent and separately that the signal has been received, that response has been actioned and that help is on its way. This in itself is of great benefit to the diver, it helps to manage stress and lead to better decision making and a likely higher survival rate.

Preferably a visual display or lights are provided to provide a visual indication or alternatively or additionally an audible indication could be provided to the diver and boat crew. In one embodiment the visual indication of the statuses of messages received, help is on its way and proximity of the cover boat, are LED lights that can be based upon the sequence and frequency and/or colour, which the user will have been trained to recognise.

Importantly the signal received by the diver can additionally include data on the location of the cover vessel and the bearing and/or distance. This indication could be provided by increasing the flashing frequency of the LED or the beep frequency if audible indication is used, or alternatively or additionally provided on the visual display. This indication of the location or bearing of the cover vessel will help to further reduce stress levels since the diver knows to look in the correct direction and will see the oncoming cover vessel sooner. In addition, in the case of a visual display, the bearing of the cover vessel can be readily indicated and the diver may be able to swim or paddle in the indicated direction towards the vessel. This will both reduce the time to recovery and also provide the diver with a workable objective which will both add to the warmth in the body and also assist the emotional well-being of the diver, all of which factors will significantly increase the survival rate.

The tracking apparatus is capable of dealing with multiple divers in the water. The tracking unit allows signals to be transmitted every n seconds, where n is the maximum number of divers or units. For example, if the diver position were transmitted no later than every 10 seconds, this allows up to ten units to transmit in a staggered manner, separated by 1 second. The tracking unit uses the GNSS time stamp to determine when to transmit modified by the optimum communication window calculation. A simple selection on the boat unit allows one diver position to be displayed or for the unit to cycle through multiple divers if using the boat unit's own built-in indicator. If using an external device (such as Chartplotter or paired auxilliary device), then additionally, all diver positions can be shown simultaneously together with other relevant data.

Other methods of dealing with multiple divers includes using different channels for each diver unit to stagger the transmission time by a value determined by the unique unit identifier and allow the protocol to handle any clashes. Alternatively to use the boat unit processor to determine the time interval to be used, for example by determining how many divers there are by counting the different unit identifiers, allocating a time interval for transmission to each one, and transmitting the appropriate time interval to each diver unit.

Transmission uses one of the licence free bands for communications of 433 MHz, 868 MHz or 915 MHz.

The tracking apparatus may have any of the following additional functionality. Transmission of an emergency signal through the Digital Selective Calling (DSC) facility of the VHF radio. Immobilisation of the Auto-pilot and/or the engine in the event of an emergency (and other applications). Other sensors may also be used, for example a heat sensor.

The boat tracking unit may have a "locate diver tracking unit" function using the unique identifier of a diver tracking unit, where the position of an identified diver unit is obtained from the diver unit and is displayed. Also a 'locate all units' function may be provided where all units' positions and identities are displayed cyclically, if using the unit's inbuilt visual display. It would then be possible to calculate and display bearing and distance to the unit(s) for example they could be displayed on a schematic or map.

Figure 6:
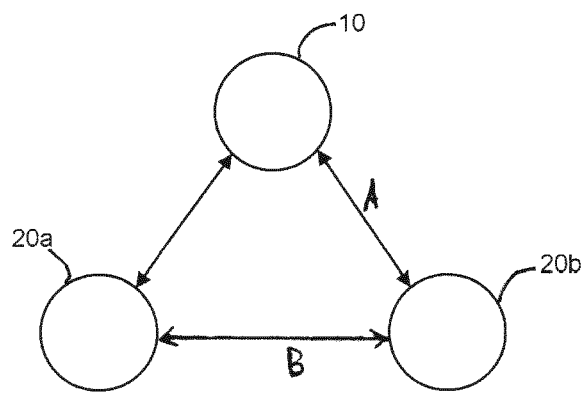
FIG. 6 shows a further embodiment with a third tracking unit forming an RF network.

Additionally each personal tracking unit can communicate with other personal tracking units so that a network of tracking units is created as shown in FIG. 6. Typically this would be one base unit and a plurality of personal units in communication with the base unit as shown by arrow A. In a further embodiment, the personal tracking units are in communication with each other as shown by arrow B in FIG. 6, so a network is formed of a plurality of personal units. The network could be of just personal tracking units 20a, 20b etc., without a separate base tracking unit. Each display can be configured to show the participants in the network and then to select each participant to display the bearing and distance of that particular unit. Similarly the display can be configured to show the nearest unit.

A generic SOS signal can be transmitted by each tracking unit. This may happen in two ways:
(a) unit 1 sends an alert to unit 2
(b) a unit in network 1 sends an alert to a unit in network 2

Network 1 could be a network at sea with a lost diver situation, and network 2 within radio range could be a second network at sea or on land. When an Alert is generated, its development is monitored against elapsed time. At various stages, the situation status is communicated to Network 2 via status codes in a network-level message e.g.: Alert Generated, Retrieval In Progress, Retrieval Fail (in an escalating situation), Retrieval Success stand down (in a de-escalating situation). On receiving a status code 'Retrieval Fail' any recipients in the area would then call out the Emergency Services.

The invention claimed is:

1. A tracking system comprising: a first tracking unit and a second tracking unit each unit comprising a satellite signal receiver, a microprocessor, a radio frequency (RF) transmitter and receiver; and an indicator means; and in which upon activation of the first unit, the first unit satellite signal receiver is arranged to receive satellite signals and to determine a location of the first unit; the first unit microprocessor is arranged in operation to receive the location from the first unit satellite signal receiver and generate a first unit location signal in dependence upon said location; and the first unit RF transmitter is arranged to transmit said signal; the second unit is arranged to receive satellite signals and calculate a second unit location; the second unit microprocessor is arranged in operation to receive the second unit location from the second unit satellite receiver; the second unit RF receiver is arranged to receive said first unit location signal; and the second unit microprocessor is arranged upon receipt of said first unit location signal to determine the first unit location; and determine a bearing and distance in dependence upon the first unit location and the second unit location; and indicate said bearing and distance on said second unit indicator means, characterised in that the first and second tracking units also include a line of sight obstruction detecting means for detecting the presence of nearby obstructions, and a height position determining means for determining the relative height of the first and second tracking units, wherein the respective first and second tracking unit microprocessors include means of calculating, with reference to a time source, an optimum communications window, based on the RF signal data, to transmit and receive an RF signal in the future, based on the detected nearby obstructions, if any, and the height position data, and calculated predicted values for a wave height and period, and sends an instruction to the respective one of the first and second RF transmitters to transmit and receive a signal in the optimum communications window.

2. A tracking system according to claim 1, characterised in that the line of sight obstruction detecting means for detecting the presence of nearby obstructions is based on RF signals.

3. A tracking system according to claim 1, characterised in that the time source is provided by the satellite signal, and in case the satellite signal is lost by an internal clock in a given one of the first and second tracking units and in that the time source is provided primarily by a first one of two time sources and in the event of the failure of the first time source the microprocessor of the given one of the first and second tracking units detects the failure and utilises a second one of the two time sources.

4. A tracking system according to claim 1, characterised in that each unit comprises an additional short distance wireless communication means to an auxiliary device.

5. A tracking system according to claim 1, characterised in that the tracking system includes a means of performing a registration process that identifies an individual or a coordinator with a particular tracking unit and the identity is displayed on the indicator means of the individual or coordinator tracking means respectively.

6. A tracking system according to claim 1, characterised in that each unit comprises a power on/off button and when the unit is switched on an automatic self-check is performed to check the units are transmitting and receiving to and from each other correctly and the result of the check is indicated on the indicator means of each unit.

7. A tracking system according to claim 1, characterised in that a given one of the first and second tracking units will intermittently be unable to transmit an RF signal or deactivated, and upon regaining the ability to send a signal or upon reactivation, an activation signal is transmitted by the RF transmitter of the given one of the first and second tracking units to another one of the first and second tracking units.

8. A tracking system according to claim 1, characterised in that the indicator means is at least one light.

9. A tracking system according to claim 1, characterised in that each tracking unit comprises a data logging device which stores the historical data for that unit, on a separate data logging chip.

10. A tracking system according to claim 1, characterised in that the RF transmitter of a given one of the first and second tracking units has a variable power setting and the power setting can be changed depending upon the location of the second tracking unit in relation to the first tracking unit.

11. A tracking system according to claim 1, characterised in that a transmitted signal is converted into a coded flash pattern on the indicator means.

12. A tracking system according to claim 1, characterised in that a third tracking unit is provided in RF communication with the first and second tracking units to form a local radio network.

13. A tracking system according to claim 1, characterised in that each tracking unit has a battery and a battery charge measuring means.

14. A tracking system according to claim 13, characterised in that the battery level of the first tracking unit is transmitted to the second tracking unit.

15. A tracking system according to claim 12, characterised in that, in the event that the second tracking unit is nearer to the first tracking unit than the third tracking unit, signals from the first tracking unit are transmitted to the second tracking unit first and then re-routed by the second tracking to the third tracking unit.

16. A tracking system according to claim 1, characterised in that the first tracking unit includes an RF signal strength measuring means which measures the strength of received signals.

17. A tracking system according to claim 13, characterised in that in the event of a weak signal, a signal power is increased, and in the event of a strong signal, the signal power is reduced to save charge.

18. A method of tracking a plurality of persons or things comprising: a first tracking unit and a second tracking unit each unit comprising a satellite signal receiver, a microprocessor, a radio frequency (RF) transmitter and receiver; and an indicator means; and in which in a first step the first unit is activated, the first unit satellite signal receiver receives satellite signals and to determine a location of the first unit; the first unit microprocessor operates to receive the location from the first unit satellite signal receiver and generates a first unit location signal including said location; and the first unit RF transmitter transmits said signal; the second unit receives satellite signals and determines the second unit location; the second unit microprocessor operates to receive the second unit location from the second unit satellite receiver; the second unit RF receiver receives said first unit location signal; and the second unit microprocessor determines the first unit location upon receipt of said first unit location signal; and determines a bearing and distance in dependence upon the first unit location and the second unit location; and indicates said bearing and distance on said second unit indicator means, characterised in that the first and second tracking units also include a line of sight obstruction detecting means for detecting the presence of nearby obstructions, and a height position determining means for determining the relative height of the first and second tracking units, and an RF signal strength measuring means for determining the RF signal strength, wherein the first and second unit microprocessors calculate, with reference to a time source, an optimum communications window, based on the RF signal data, to transmit and receive an RF signal in the future, based on the detected nearby obstructions, if any, and the height position data, the signal strength, and calculated predicted values for a wave height and period, and sends an instruction to the respective one of the first and second RF transmitters to transmit and receive a signal in the optimum communications window.

* * * * *